(12) United States Patent
Gordon et al.

(10) Patent No.: US 11,494,454 B1
(45) Date of Patent: Nov. 8, 2022

(54) SYSTEMS AND METHODS FOR SEARCHING A SCHEMA TO IDENTIFY AND VISUALIZE CORRESPONDING DATA

(71) Applicant: Palantir Technologies Inc., Palo Alto, CA (US)

(72) Inventors: Katherine Gordon, New York, NY (US); Aaron Stromberg, Washington, DC (US); Jacquelyn Sanchez, Arlington, VA (US); Katherine Karg, Brooklyn, NY (US); Nghia Nguyen, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 421 days.

(21) Appl. No.: 16/250,824

(22) Filed: Jan. 17, 2019

Related U.S. Application Data

(60) Provisional application No. 62/669,108, filed on May 9, 2018.

(51) Int. Cl.
| | | |
|---|---|---|
| *G06F 16/95* | (2019.01) | |
| *G06F 16/9538* | (2019.01) | |
| *G06F 16/21* | (2019.01) | |
| *G06N 20/00* | (2019.01) | |
| *G06F 16/22* | (2019.01) | |
| *G06F 16/9535* | (2019.01) | |

(52) U.S. Cl.
CPC ........ *G06F 16/9538* (2019.01); *G06F 16/212* (2019.01); *G06F 16/221* (2019.01); *G06F 16/9535* (2019.01); *G06N 20/00* (2019.01)

(58) Field of Classification Search
CPC .. G06F 16/211; G06F 16/9538; G06F 16/221; G06F 16/212; G06F 16/9535
See application file for complete search history.

(56) References Cited

U.S. PATENT DOCUMENTS

| | | |
|---|---|---|
| 6,801,229 B1 | 10/2004 | Tinkler |
| 9,753,928 B1 | 9/2017 | Elmore et al. |
| 2002/0052893 A1 | 5/2002 | Grobler et al. |
| 2005/0234900 A1* | 10/2005 | Bossman .............. G06F 16/217 |

(Continued)

OTHER PUBLICATIONS

Official Communication for U.S. Appl. No. 15/654,952 dated May 25, 2018.

(Continued)

*Primary Examiner* — Mohammad S Rostami
(74) *Attorney, Agent, or Firm* — Sheppard Mullin Richter & Hampton LLP

(57) ABSTRACT

Systems and methods are provided for searching a schema to identify and visualize corresponding data. The system may be configured to receive a search query and search the schema for columns that correspond to one another. Individual ones of the corresponding columns may have different labels or different data types. Results for the search query may be determined. The results may include a first set of columns that satisfy the search query including a first column and a second column that correspond to each other but have one or more different labels or different data types. The system may be configured to generate a graphical representation of a data distribution for the first column responsive to receiving a selection of the first column.

18 Claims, 6 Drawing Sheets

(56) References Cited

U.S. PATENT DOCUMENTS

| | | | | |
|---|---|---|---|---|
| 2007/0288495 | A1* | 12/2007 | Narasayya | G06F 16/217 |
| 2011/0153667 | A1 | 6/2011 | Parmenter et al. | |
| 2014/0222782 | A1* | 8/2014 | Golovchinsky | G06F 16/951 |
| | | | | 707/722 |
| 2014/0289223 | A1* | 9/2014 | Colwell | G06F 16/2455 |
| | | | | 707/722 |
| 2015/0254369 | A1* | 9/2015 | Hou | G06F 16/904 |
| | | | | 707/798 |
| 2015/0358383 | A1* | 12/2015 | Nathan | H04L 67/02 |
| | | | | 707/760 |
| 2016/0239552 | A1* | 8/2016 | Uchida | G06T 11/206 |
| 2018/0024701 | A1* | 1/2018 | Sanches | G06F 40/166 |
| | | | | 715/781 |
| 2018/0024731 | A1* | 1/2018 | Sanches | G06F 8/38 |
| | | | | 715/763 |
| 2018/0129368 | A1* | 5/2018 | Cheung | G06F 16/248 |
| 2018/0150548 | A1* | 5/2018 | Shah | G06F 16/285 |
| 2018/0181657 | A1* | 6/2018 | Giardina | H04L 63/101 |
| 2018/0314737 | A1* | 11/2018 | Chong | G06F 16/2282 |
| 2018/0336198 | A1* | 11/2018 | Zhong | G06N 7/005 |
| 2019/0108244 | A1 | 4/2019 | Ackner et al. | |
| 2019/0156927 | A1* | 5/2019 | Virkar | G06F 16/21 |
| 2019/0179810 | A1* | 6/2019 | Miller | G06F 16/24564 |

OTHER PUBLICATIONS

Official Communication for U.S. Appl. No. 15/654,952 dated Sep. 25, 2017.

* cited by examiner

SYSTEMS AND METHODS FOR SEARCHING A SCHEMA TO IDENTIFY AND VISUALIZE CORRESPONDING DATA

CROSS REFERENCE TO RELATED APPLICATIONS

This application claims the benefit under 35 U.S.C. § 119(e) of U.S. Provisional Application Ser. No. 62/669,108, filed May 9, 2018, the content of which is hereby incorporated by reference in its entirety.

TECHNICAL FIELD

This disclosure relates to approaches for searching a schema to identify and visualize corresponding data.

BACKGROUND

Under conventional approaches, clinical trial data sets for different clinical trials may come in a variety of formats. For example, different columns within different data sets may have different data labels, data types, variable names, domains, applications, or protocols. The data may correspond or be comparable (e.g., both data subsets may indicate age), but they may not appear to correspond because they may have different labels (e.g., "age" and "age 75 years or over at enrollment"), variable names (e.g., "age" and "agey75"), and/or data types (e.g., float and text). Often, researchers and practitioners are forced to manually search columns within different data sets to attempt to identify corresponding data, or they are limited to the clinical data from individual studies.

SUMMARY

Various embodiments of the present disclosure can include systems, methods, and non-transitory compute readable media configured to receive a search query to search a schema for columns that correspond, wherein individual ones of the columns have individual labels and data types, and wherein at least one of the individual labels or the data types are different for one or more columns that correspond; determine results for the search query, the results including a first set of columns that satisfy the search query, wherein the first set of columns potentially correspond and one or more of the columns within the first set of columns have at least one of different labels and different data types, such that a first column and a second column included in the first set of columns correspond to each other and have one or more different labels or data types; and generate, responsive to receiving a selection of the first column, a graphical representation of a data distribution for the first column.

In some embodiments, the systems, methods, and non-transitory computer readable media are configured to receive selection of a first subset of columns, wherein selection of the first subset of columns indicates the first subset of columns correspond.

In some embodiments, the systems, methods, and non-transitory computer readable media are configured to determine the results for the search query based on information in a supporting file.

In some embodiments, the systems, methods, and non-transitory computer readable media are configured to determine the results based on machine learning.

In some embodiments, the systems, methods, and non-transitory computer readable media are configured to identify a first subset of columns based on the graphical representation of the data distribution, wherein the columns included in the first subset of columns correspond.

In some embodiments, the systems, methods, and non-transitory computer readable media are configured to normalize at least one of the different labels and the different data types in the first subset of columns such that the first column and the second column have at least one of a corresponding label and a corresponding type of data included.

In some embodiments, the graphical representation of the data distribution includes at least one of a value distribution graph for values within a first data set corresponding to the first column and one or more statistics characterizing the first data set.

In some embodiments, the columns comprise subsets of data from data sets for multiple clinical trials.

In some embodiments, the systems, methods, and non-transitory computer readable media are configured to receive a filter selection, the filter selection including at least one of an application, a protocol, and a domain; and filter the results for the search query based on the filter selection.

In some embodiments, the data included in data sets corresponding to the columns is at least one of Clinical Data Interchange Standards Consortium (CDISC) standardized data and legacy data.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

DETAILED DESCRIPTION

Figure 1:
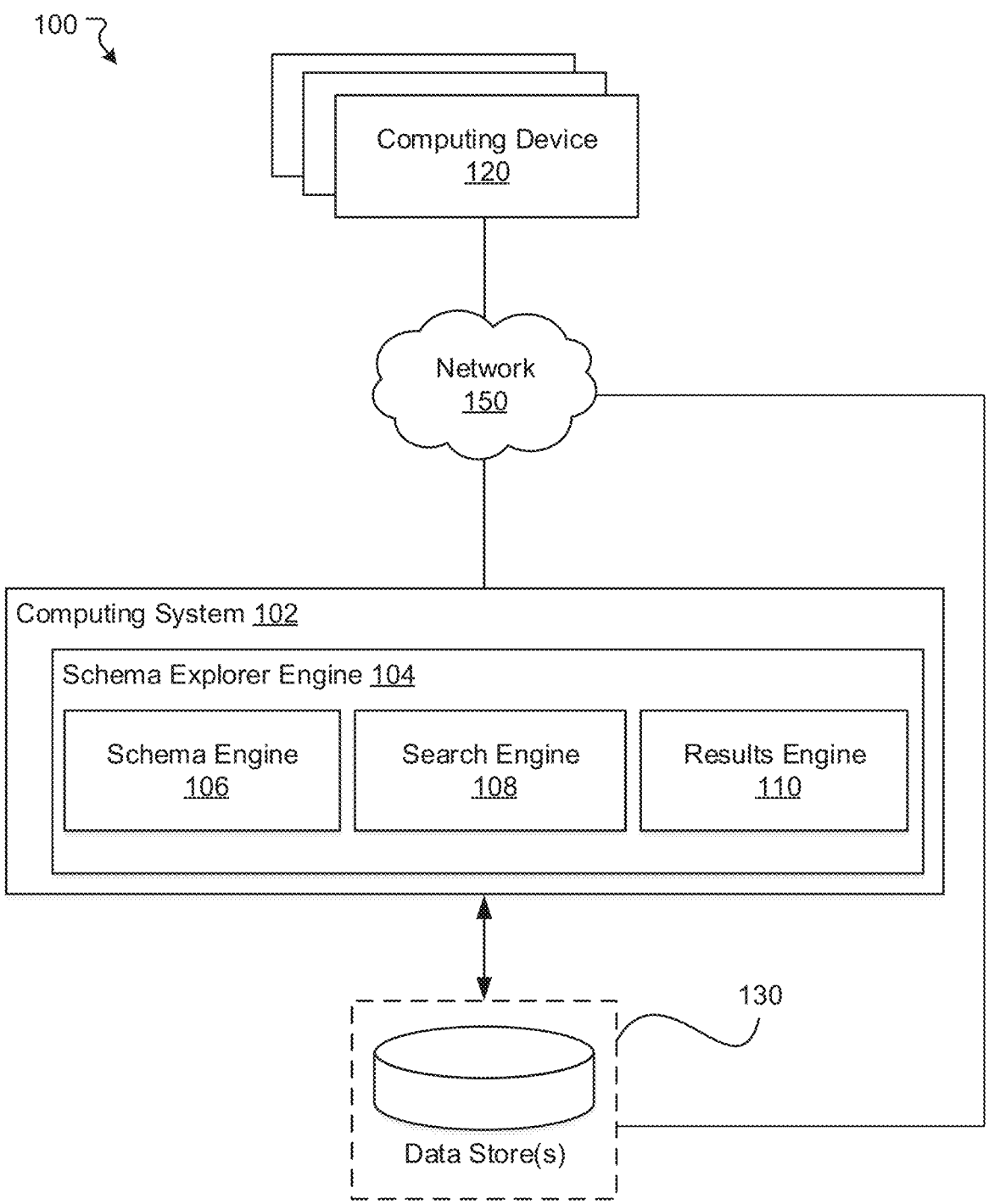
FIG. 1 depicts a diagram of an example of a system for searching a schema to identify and visualize corresponding data, in accordance with various embodiments.

A claimed solution rooted in computer technology provides a technological improvement over existing implementations of searching a schema to identify and visualize corresponding columns. The systems and methods may enable searching the schema of a database comprising multiple data sets to identify and visualize corresponding columns that have at least one of different data labels, data types, variable names, domains, applications, and protocols.

In various embodiments, data sets corresponding to several clinical trials may be organized (or labeled) based on a schema. Further, the data sets may not be normalized. In some embodiments, such data sets can be stored in one or more databases based on one or more schemas. In order to compare and analyze the data sets, the schema and/or data may need to be normalized. The schema may need to be normalized first in order to identify which columns and corresponding data subsets are comparable. For example, in two different clinical trials that consider the patient's age, one column for a subset of data corresponding to age may be labeled "Age" while another column for another subset of data corresponding to age may be labeled "Age 75 years or over at enrollment". In another example, in two different clinical trials that consider patient age, a column corresponding to age for a first clinical trial may be formatted as a "float" data type while a column corresponding to age for a second clinical trial may be formatted as a "text" data type. The different columns for different subsets of data may have differences because they are columns from various tables representing different data sets.

As mentioned, in some embodiments, data sets can be stored in one or more databases based on one or more schemas. In such embodiments, individual ones of the database columns may have individual labels and types of data that are included. The labels and/or types of data for corresponding columns may be different. An interface for searching the schema of the overarching database may be presented. The interface may present the schema information for the columns as rows within the interface. The columns may have different applications, protocols, domains, variable names, labels, and/or data types despite including similar data that is comparable or aggregable. In various embodiments, data sets from different clinical trials can be searched and identified based on various criteria. For example, in some embodiments, a search query may indicate a category or type of columns a given user is looking for. A set of columns satisfying the search query, including those that have different labels and/or data types, may be provided. For example, if the user enters in "age", columns that are likely to include subsets of data indicating the patients' ages may be included in the results. A graphical representation of a data distribution for an individual column may be generated to illustrate whether or not the data included in a given column corresponds to the data the user is looking for. In some implementations, the graphical representation of the data distribution may include a value distribution graph for values within a given data set corresponding to some column. The value distribution graph may illustrate the distribution of values within the given data set corresponding to the column such that a user or the system can quickly determine whether the value distribution makes sense for the type of data desired. Additionally, the graphical representation may include statistical information describing the given data set. For example, such statistical information can include a min, max, median, sum, variance, mean, unique value count, null count, row count, and/or other statistics describing the data set.

In some embodiments, machine learning can be applied to identify data sets (e.g., columns) that best correspond to a given search query (or term). For example, machine learning can be applied to predict one or more columns based on a given search query. In such embodiments, a machine learning model can be trained using a set of examples that each indicate a search query submitted by some user and one or more responsive data sets (or columns) that were ultimately selected by that user. These examples can be used to train the model to predict data sets (or columns) that best relate to any given search query (or term). Many other variations are possible.

FIG. 1 illustrates an example environment 100, in accordance with various embodiments. The example environment 100 may include at least one computing system 102 that includes one or more processors and memory. The processors may be configured to perform various operations by interpreting machine-readable instructions. In some embodiments, the example environment 100 may be implemented as a schema search platform. In some embodiments, the example environment 100 may be configured to interact with computing systems of a schema search platform. In various embodiments, computing systems of the schema search platform may receive and process search queries to identify columns of data sets that are responsive to the search queries.

In some embodiments, the computing system 102 may include a schema explorer engine 104. The schema explorer engine 104 may include a schema engine 106, a search engine 108, and a results engine 110. The schema explorer engine 104 may be executed by the processor(s) of the computing system 102 to perform various operations including those operations described in reference to the schema engine 106, the search engine 108, and the results engine 110. In general, the schema explorer engine 104 may be implemented, in whole or in part, as software that is capable of running on one or more computing devices or systems. In one example, the schema explorer engine 104 may be implemented as or within a software application running on one or more computing devices (e.g., user or client devices) and/or one or more servers (e.g., network servers or cloud servers). In some instances, various aspects of the schema explorer engine 104, the schema engine 106, the search engine 108, and the results engine 110 may be implemented in one or more computing systems and/or devices.

The environment 100 may also include one or more data stores 130 accessible to the computing system 102. The data stores 130 may be accessible to the computing system 102 either directly or over a network 150. In some embodiments, the data stores 130 may store data that may be accessed by the schema explorer engine 104 to provide the various features described herein. In some instances, the data stores 130 may include federated data stores, databases, or any other type of data source from which data may be stored and retrieved, for example. In some implementations, data stores 130 may include data sets from various clinical trials. In some embodiments, the data sets may correspond to CDISC standardized data and/or legacy data. However, the CDISC standardized data may not be standardized effectively across different clinical trials having data sets with different schema information.

The schema engine 106 may be configured to obtain schema information corresponding to data sets. In some embodiments, a data set may correspond to information stored in a given database table that is made up of a number of columns and rows. Each of the data sets may be organized in different database tables having different schema information (e.g., column labels, data types, variable names, descriptions, etc.). In such instances, identifying corresponding (or related) columns across data sets can be difficult due to the data sets being organized using different schemas.

Search engine 108 may be configured to receive and process search queries. In some embodiments, search queries can be submitted to the search engine 108 through an explorer interface that enables users to search across various data sets for columns that are responsive to search terms included in submitted search queries. For example, a user may submit a search query for "height". In this example, the search engine 108 can search across various data sets (or databases through which those data sets are accessible) to identify any columns that are responsive to the search query for "height".

In some embodiments, the results engine 110 may be configured to determine search results for submitted search queries. In some embodiments, search results for a search query may include a set of columns that satisfy the search query. These columns may correspond to various, different data sets and may be retrieved from different databases (or database tables). In some embodiments, a column may be determined to satisfy a search query when that column is associated with one or more labels, data types, variable names, and/or descriptions that are determined to be responsive to terms in the search query.

In some embodiments, the results engine 110 may be configured to determine the results for the search query based on machine learning. For example, the results engine 110 may be configured to generate a machine learning model. The machine learning model may be trained using a set of examples. For example, individual examples within the set of examples may each include a search query as input and information describing one or more data sets (or columns) that a user selected in response to the search query as a supervisory signal. The machine learning model may be configured to output a prediction for one or more relevant data sets (or columns) for a given search query.

In some embodiments, the results engine 110 may be configured to obtain and/or receive information from a supporting file. The information from the supporting file may be used to determine the results for the search query. In some embodiments, user may upload a supporting file including information defining and characterizing search terms for a search query and/or one or more alternatives for the search terms for the search query. For example, the supporting file may include information characterizing the schema information for individual ones of the columns.

The results engine 110 may be configured to generate a graphical representation of a data distribution for a given data set (or column). For example, a data distribution for a given column may be generated responsive to receiving a user selection of the column. In some embodiments, the graphical representation of the data distribution may include one or both of a value distribution graph for values within a data set corresponding to the column and statistical information describing the data set. The value distribution graph may, for example, include a bar graph or other type of graph representing a distribution of values within the data set corresponding to the column. The statistical information describing the data set may include one or more of: a minimum value, a maximum value, and median, a sound, a variance, a mean, a unique value statistic, a null count, a row count (e.g., indicating the number of rows within the selected column), and/or other statistics. The columns included in the results for the search query may be presented as individual rows in a results table. An individual row in the results table may include the schema information for the corresponding column included in the results. In some embodiments, search results may be presented in a table where rows of the table correspond to data sets (or columns) responsive to the search query. Responsive to a user selecting one of the rows, a graphical representation of the data distribution for the column corresponding to the selected row may be generated. The graphical representation may include a value distribution graph illustrating the distribution of values within the data set for the column corresponding to the selected row. In some embodiments, the graphical representation may include one or more statistics for this data set for the column corresponding to the selected row. The values included in the data set corresponding to the selected column may be presented such that the user can view the values within the data set corresponding to the selected column to identify whether or not the data set may correspond to other data sets the user is searching for. More details describing the results engine 110 will be provided below in reference to FIG. 2. More details describing the graphical representations are provided below in reference to FIGS. 3A and 3B.

The results engine 110 may be configured to provide an interface (e.g., graphical user interface) through which information can be visualized and/or selected. For example, such information can include search results, a graphical representation of a data distribution, a value distribution graph, statistical information, corresponding columns (e.g., data sets), and/or corresponding data may be visualized and/or selected. For example, the interface may be provided by a software application (e.g., a schema explore application, web browser, etc.) running on a computing device 120 and through a display screen of the computing device 120. The interface may provide users with the ability to submit search queries, view search results, filter the search results, select one or more columns, view data within data sets, view one or more graphical representations of data distributions, view a value distribution graph, and view statistical information as described in reference to FIGS. 3A and 3B.

Figure 2:
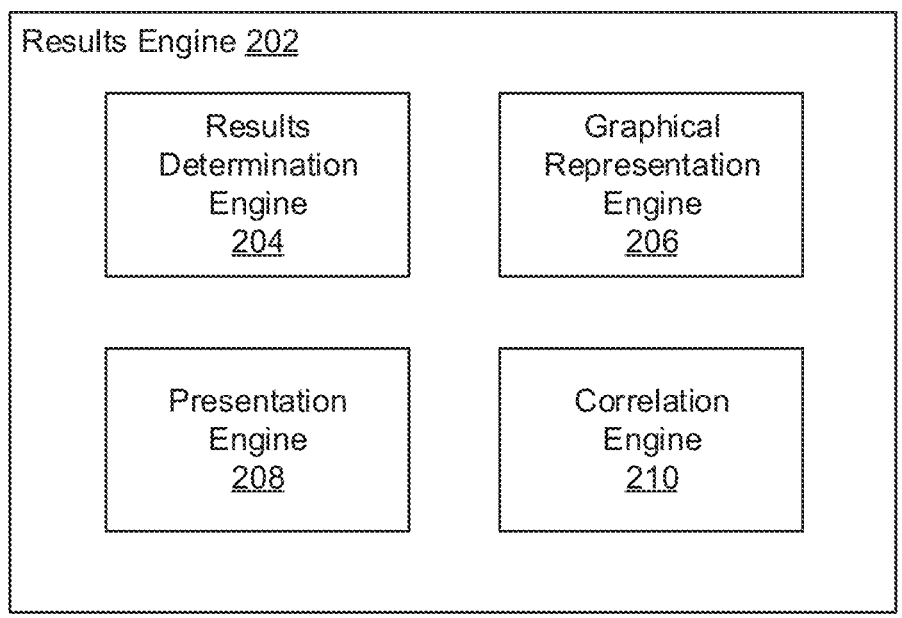
FIG. 2 depicts a diagram of a results engine, in accordance with various embodiments.
Figure 3A:
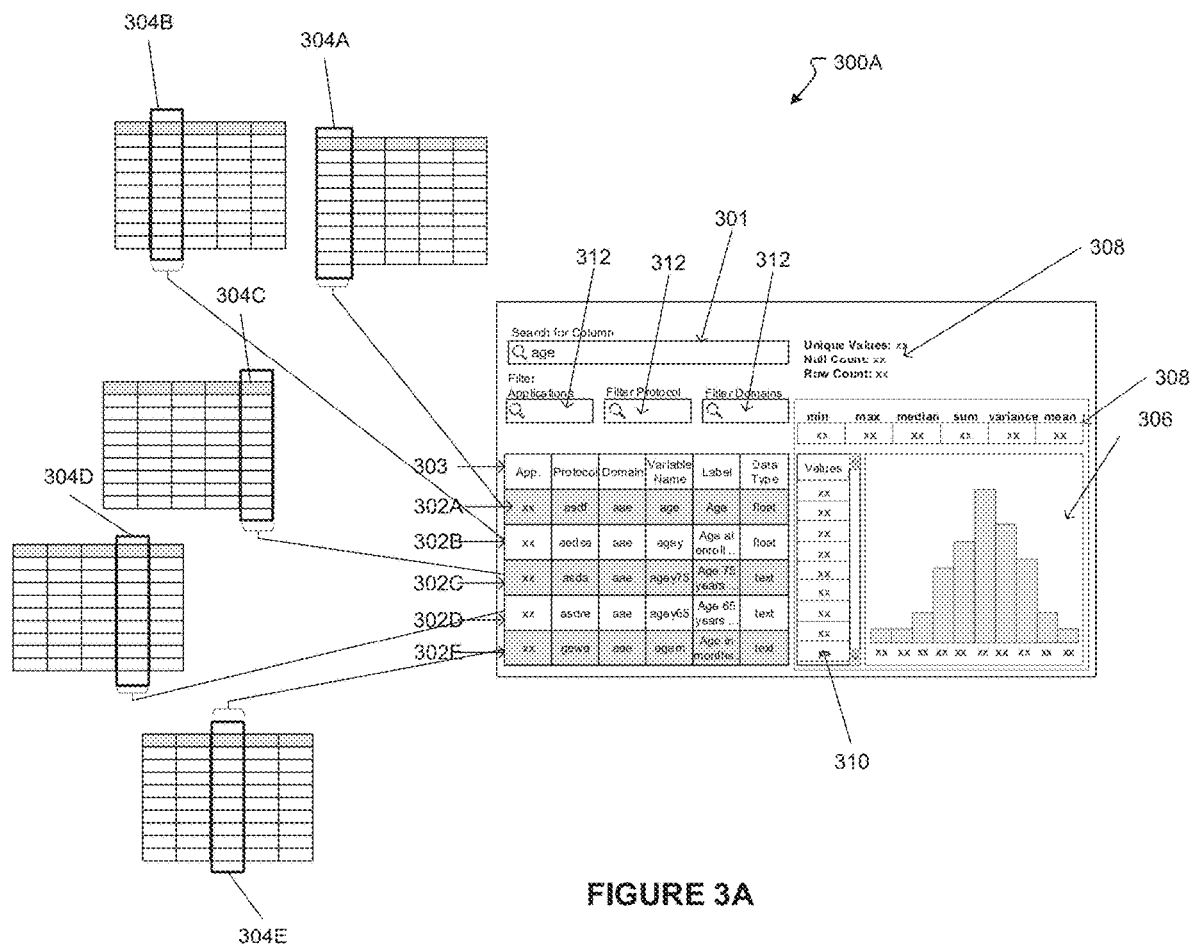
FIGS. 3A-3B illustrate example interfaces for searching a schema to identify and visualize corresponding data, in accordance with various embodiments.

FIG. 2 illustrates an example results engine 202, in accordance with various embodiments. The results engine 202 may be implemented as the results engine 110 of FIG. 1. In some embodiments, the results engine 202 includes a results determination engine 204, a graphical representation engine 206, a presentation engine 208, and a correlation engine 210.

In various embodiments, the results determination engine 204 may be configured to determine search results that satisfy the search query. The search results may reference a number of data sets (or columns). The columns may include a first column and a second column that correspond to each other but have one or more different label or datatype. That is, values included in the first column and values included in the second column may be comparable or aggregable but the columns may be labeled or formatted differently. The results determination engine 204 may perform one or more of the operations described in connection with results engine 110.

In some embodiments, the results determination engine 204 may be configured to determine search results responsive to a search query. In some embodiments, the results determination engine 204 can provide options for filtering the search results. For example, the results determination engine 204 may receive a filter selection indicating at least one of an application, a protocol, and/or a domain. The results determination engine 204 may be configured to filter the search results based on the filter selection. The search results may be filtered based on schema information. For example the results for the search query may be filtered based on application, protocol, domain, variable name, label, datatype, and/or other schema information. In some embodiments, the results determination engine 204 may be configured to determine search results based on machine learning. In some embodiments, search results may be determined based on information included in a supporting file. The information in a supporting file may characterize or define schema information for columns or data sets within a given database.

In some embodiments, the graphical representation engine 206 may be configured to generate a graphical representation of a data distribution for a data set (or column). The graphical representation may be generated in response to a user selection of the column. The graphical representation of the data distribution for the column may illustrate a distribution of values within the data set corresponding to the column. The visualization of the distribution of values within the data set as provided by the graphical representation enables users to easily identify whether or not the data set corresponding to the column contains the type of data being sought (e.g., whether the column corresponds to other relevant columns or data sets).

In some embodiments, the graphical representation engine 206 may be configured to identify a first subset of columns that correspond based on the graphical representation of the data distribution. By way of non-limiting example, if the data distribution for two columns both indicate that most of values within the corresponding data sets are distributed among values 18 to 100, the two columns may correspond and contain corresponding data related to patients' ages.

In some embodiments, the graphical representation engine 206 may be configured to determine statistical information describing a given data set. The statistical information describing the given data set may include one or more of: a minimum value, a maximum value, a median, a sum, a variance, a mean, a unique value statistic, a null count, a row count (e.g., indicating the number of rows within the selected column), and/or other statistics. For example, a median value for a column may provide an indication that the column includes patients' ages. In some embodiments, a null count for a given data set may indicate whether or not the data set corresponds to another data set. For example, in some countries, a patient's date of birth is considered extremely personal information such that a user may expect a DOB column to have a high null count (e.g., include several blanks).

A value distribution graph may, for example, include a bar graph or other type of graph representing the distribution of the values within a data set corresponding to a column included in a set of search results. For example, each bar on a bar graph may represent a value or a range of values within a data set. The height of each bar may correspond to a quantity of values in the corresponding data set that are the same value or within the range of values. The value distribution graph may provide an immediate indication of whether or not the values within a given data set corresponding to the selected column correspond to values a user would expect to see for the columns or data sets being searched. Many variations are possible.

In some embodiments, search results of a search query may be presented in a table format where rows of the table correspond to columns referenced by search results. Responsive to a user selecting one of the rows, a graphical representation of a data distribution for a column corresponding to the selected row may be generated. The graphical representation may include a value distribution graph illustrating the distribution of values within a data set referenced by the column. In some embodiments, the graphical representation may include statistical information describing this data set. The values included in the data set may be presented such that a user can review the values within the data set to identify whether or not the data set may satisfy the user's search query.

The presentation engine 208 may be configured to provide a graphical user interface for searching and visualizing data sets. The graphical user interface may include a search field, one or more filter fields, a results table, a statistics table, a values field, a value distribution graph, and/or other fields. For example, and referring to FIG. 3A, an example interface 300A for searching a schema to identify and visualize corresponding data, in accordance with various embodiments. Interface 300A may comprise a graphical user interface including a search field 301, one or more filter fields 312, a value distribution graph 306, statistical information 308, a values field 310, and a results table including rows 302 (302A, 302B, 302C, 302D, 302E) corresponding to columns 304 (304A, 304B, 304C, 304D, 304E) referencing various data sets. For example, the row 302B may provide information for the column 304B. Responsive to the user selecting the row 302B, information corresponding to the column 304B may be presented. For example, values corresponding to the column 304B can be presented in the value field 310. In another example, the value distribution graph 306 may be updated to a value distribution corresponding to the column 304B. Similarly, the statistical information 308 can be updated to reflect various statistics corresponding to the column 304B.

Figure 3B:
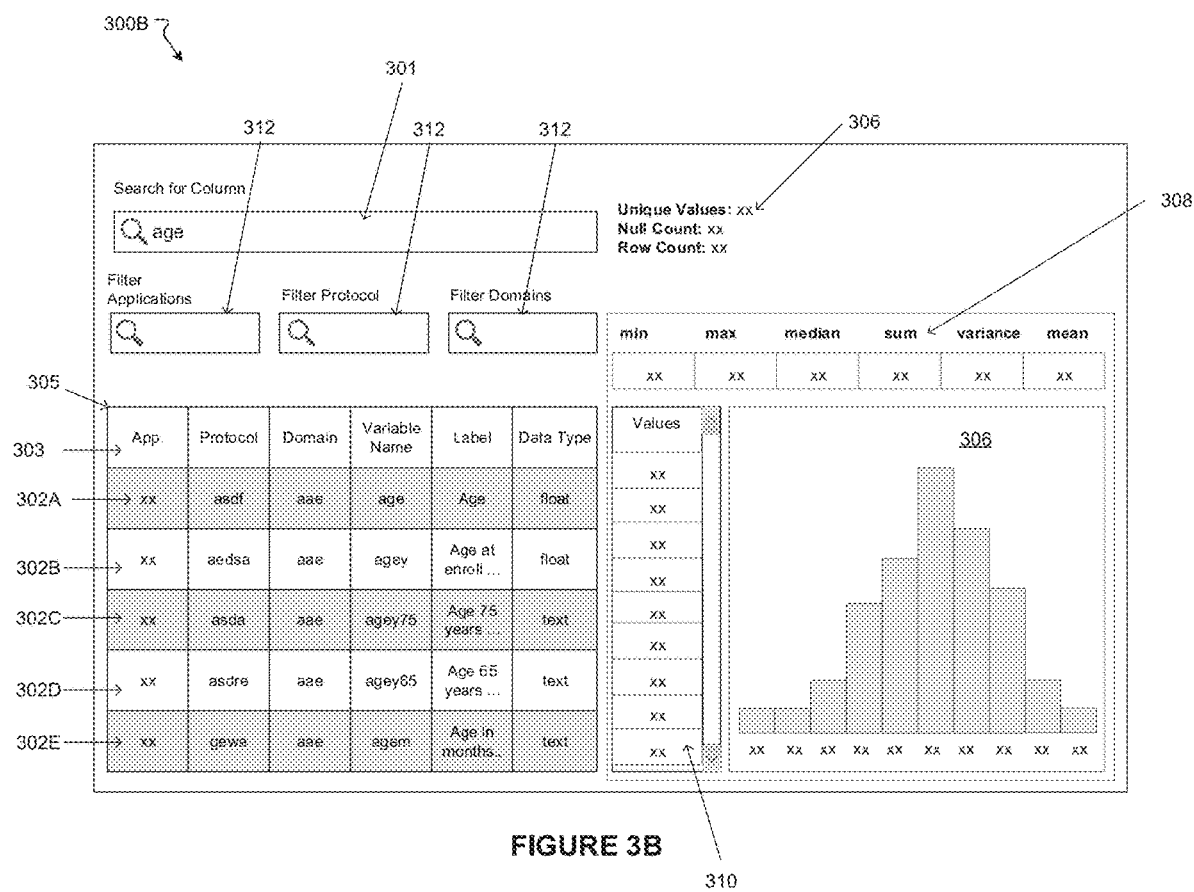

In FIG. 3B, an example interface 300B for searching a schema to identify and visualize corresponding data, in accordance with various embodiments. Responsive to a user entering "age" in search field 301, results table 305 may include rows 302 (302A, 302B, 302C, 302D, 302E) representing columns that may correspond to each other and/or satisfy the search query for "age." Responsive to a user selecting row 302D, the values within the data set for the column corresponding to row 302D may be presented in value field 310. Value distribution graph 306 may represent the values within the data set for the column associated with row 302D. Further, statistics 308 may describe the data set for the column associated with row 302D. In some embodiments, the user may filter results table 305 using one or more filter fields 312. By way of example, filter fields 312 may enable a user to filter by application, protocol, domain, variable name, label, and/or datatype.

Returning to FIG. 2, correlation engine 210 may be configured to identify one or more columns including data sets that correspond to one another. One or more columns including data sets that correspond to one another may be selected and/or included in one or more subsets of columns saved and/or stored by correlation engine 210. In some embodiments, correlation engine 210 may be configured to receive selection of a first subset of columns. Selection of the first of several columns may indicate that the first subset of columns corresponds to one another. Correlation engine 210 may store in or save the first subset of columns such that the same user or another user can find the data sets used for analysis.

In some embodiments, correlation engine 210 may be configured to identify first subset of columns based on corresponding data distributions. For example, if multiple columns within the results for a search query have similar graphical representations of their data distributions, the columns may correspond and be identified and/or selected as the first subset of columns. In some embodiments, the first subset of columns may be identified based on machine learning.

In some embodiments, correlation engine 210 may be configured to normalize at least one of the different labels, data types, variable names, domains, applications, or protocols in the first subset of columns. As such, responsive to normalizing the different labels or datatypes, the first column and the second column may have at least one of a corresponding label and a corresponding type of data included. In some embodiments, the values within the data sets may be normalized based on the normalization of the schema information for the different columns (e.g., normalization of the labels, datatypes, variable names, domains, applications, and/or protocols).

Example Flowcharts of Process

Figure 4:
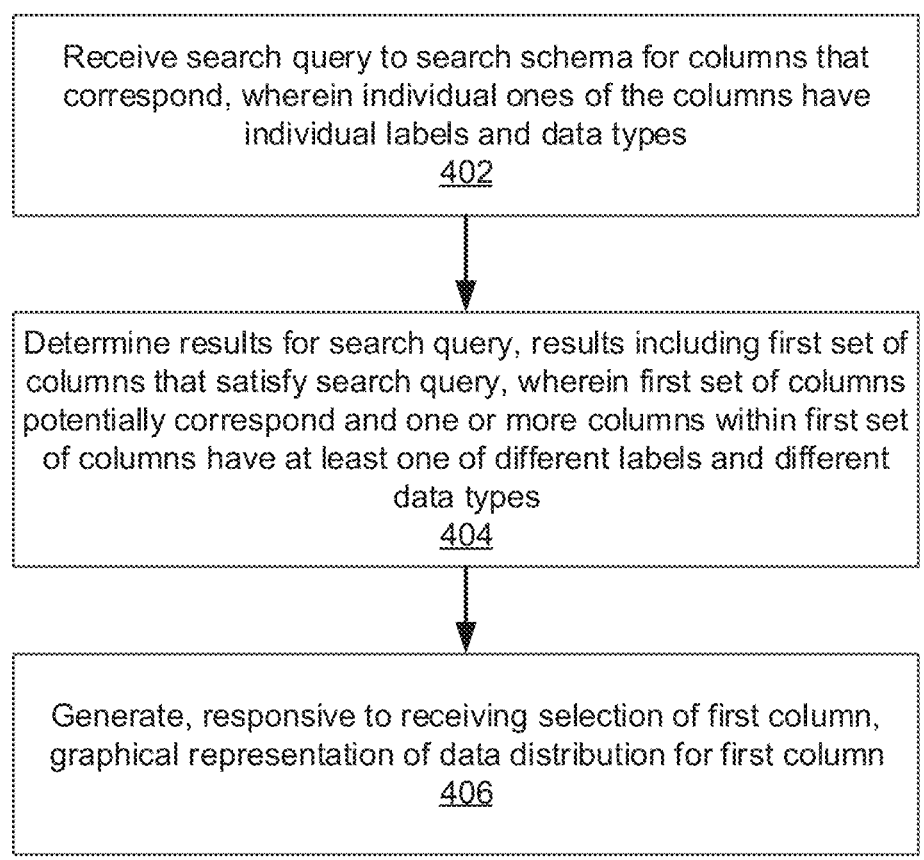
FIG. 4 depicts a flowchart of an example method, in accordance with various embodiments.

FIG. 4 depicts a flowchart of an example method 400 for searching a schema to identify and visualize corresponding data, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include receiving a search query to search a schema for columns that correspond. Individual ones of the columns may have individual labels and/or datatypes. At least one of the individual labels or datatypes for the corresponding columns may be different. In some implementations, operation 402 may be performed by a component the same as or similar to search engine 108 (shown in FIG. 1 and described herein).

In an operation 404, method 400 may include determining result for the search query. The results may include a first set of columns that satisfy the search query. The first set of columns may potentially correspond and one or more of the columns in the first set of columns may have different label and/or different datatypes. As such, a first column and a second column, included in the first set of columns that correspond to each other, may have one or more of different labels or different datatypes. In some implementations, operation 404 may be performed by a component the same as or similar to results engine 110 (shown in FIG. 1 and described herein).

In an operation 406, method 400 may include generating a graphical representation of the data distribution for the first column. The graphical representation of the data distribution for the first call may be generated responsive to receiving a selection of the first column. In some embodiments, the graphical representation of the data distribution for the first column may be presented within a graphical user interface. In some implementations, operation 406 may be performed by a component the same as or similar to results engine 110 (shown in FIG. 1 and described herein).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
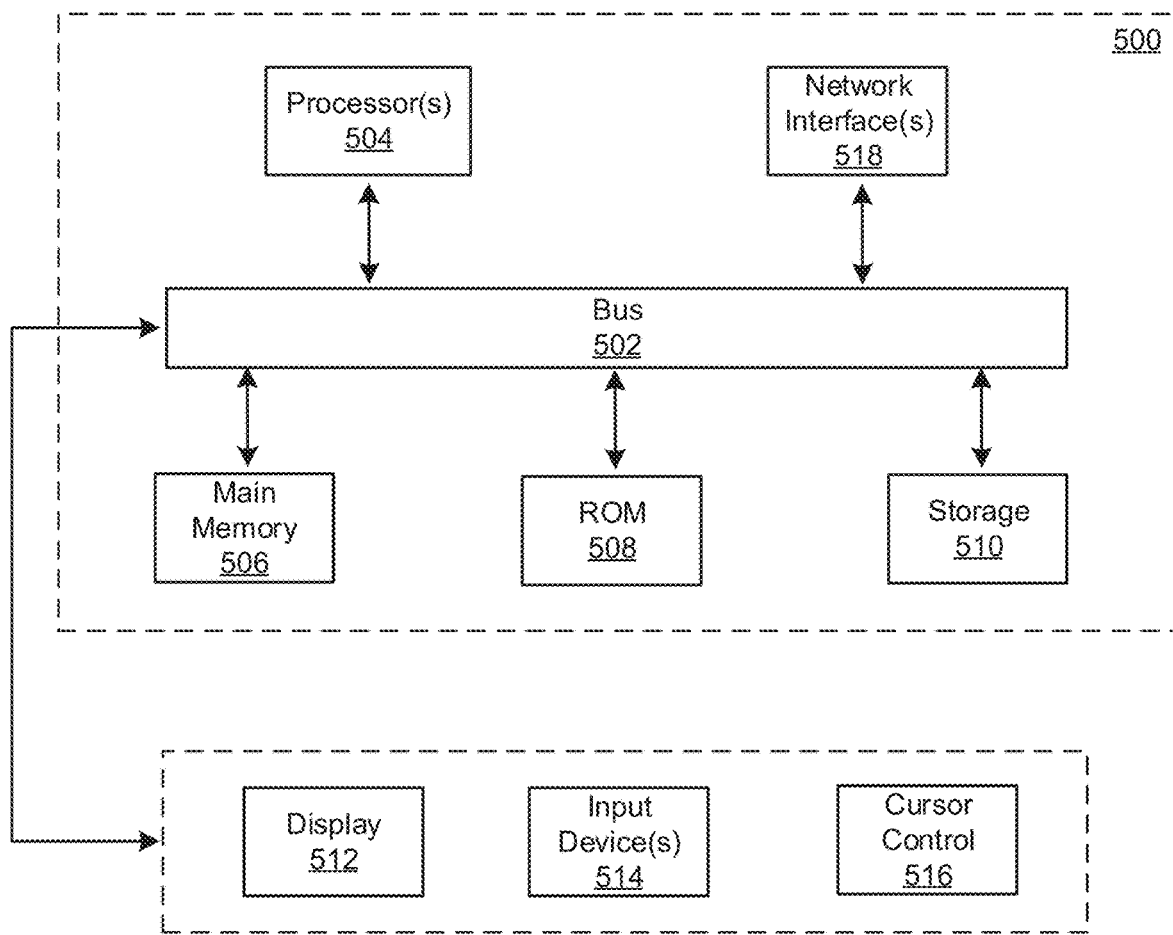
FIG. 5 depicts a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 may send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines may provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

Other implementations, uses and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system for searching schemas to identify and visualize corresponding columns, the system comprising:
   one or more processors; and
   a memory storing instructions that, when executed by the one or more processors, cause the system to:
   receive a search query to search a schema of a dataset for data columns that correspond to the search query;
   determine that a first data column of the data columns and a second data column of the data columns correspond to the search query based on a first actual null count of the first data column and a second actual null count of the second data column being within respective ranges of an expected null count of the first data column or of the second data column, wherein the expected null count is based on an extent to which information of the first data column or the second data column is personal information, wherein the first data column and the second data column have one or more different labels or data types;
   receive a selection of the first data column or the second data column; and
   generate, responsive to the selection of the first data column or the second data column, a graphical representation of a data distribution for the selected data column, wherein the graphical representation provides a value distribution graph that comprises a plurality of bars associated with values of the selected data column and statistical information associated with the values of the selected data column.

2. The system of claim 1, wherein the determination that the first data column and the second data column correspond to the search query is based on a machine learning model, wherein the machine learning model outputs a prediction for each of the data columns.

3. The system of claim 1, wherein the instructions further cause the system to:
   identify a subset of the data columns through the graphical representation of the data distribution.

4. The system of claim 3, wherein the instructions further cause the system to:
   normalize at least one of the one or more different labels or data types such that the first data column and the second data column have at least a corresponding label or a corresponding type of data.

5. The system of claim 1, wherein the statistical information includes a minimum, a maximum, a sum, a variance, and at least one of a mean or a median associated with the values of the selected data column.

6. The system of claim 1, wherein the data columns comprise data from multiple clinical trials.

7. The system of claim 1, wherein the instructions further cause the system to:
   receive a filter selection, the filter selection includes at least one of an application, a protocol, or a domain; and
   filter the results for the search query based on the filter selection.

8. The system of claim 6, wherein the data from the multiple clinical trials includes at least one of CDISC standardized data or legacy data.

9. The system of claim 1, wherein the instructions further cause the system to:
   normalize a first domain, a first application, and a first protocol corresponding to the first data column with a second domain, a second application, and a second protocol corresponding to the second data column.

10. The system of claim 1, wherein the first data column comprises a first data label having a first set of characters and the second data column comprises a second data label having the first set of characters and additional characters appended to the first set of characters without a space between the first set of characters and the additional characters, wherein the additional characters are absent from the first data label.

11. A computer-implemented method for searching schemas to identify and visualize corresponding data, the method being performed on a computer system having one or more physical processors programmed with computer program instructions that, when executed by the one or more physical processors, cause the computer system to perform the method, the method comprising:
   receiving a search query to search a schema of a dataset for data columns that correspond to the search query;
   determining that a first data column of the data columns and a second data column of the data columns correspond to the search query based on a first actual null count of the first data column and a second actual null count of the second data column being within respective ranges of an expected null count of the first data column or of the second data column, wherein the expected null count is based on an extent to which information of the first data column or the second data column is personal information, wherein the first data column and the second data column have one or more different labels or data types;
   receiving a selection of the first data column or the second data column; and
   generating, responsive to the selection of the first data column or the second data column, a graphical representation of a data distribution for the selected data column, wherein the graphical representation provides a value distribution graph that comprises a plurality of bars associated with values of the selected data column and statistical information associated with the values of the selected data column.

12. The method of claim 11, wherein the determination that the first data column and the second data column correspond to the search query is based on a machine learning model, wherein the machine learning model outputs a prediction for each of the data columns.

13. The method of claim 11, further comprising:
identifying a subset of the data columns through the graphical representation of the data distribution.

14. The method of claim 13, further comprising:
normalizing at least one of the one or more different labels or data types such that the first data column and the second data column have at least a corresponding label or a corresponding type of data.

15. The method of claim 11, wherein the statistical information includes a minimum, a maximum, a sum, a variance, and at least one of a median or a mean associated with the values of the selected data column.

16. The method of claim 11, wherein the data columns comprise data from multiple clinical trials.

17. The method of claim 11, further comprising:
receiving a filter selection, the filter selection including at least one of an application, a protocol, or a domain; and
filtering the results for the search query based on the filter selection.

18. The method of claim 16, wherein the data from the multiple clinical trials includes at least one of CDISC standardized data or legacy data.

* * * * *